United States Patent
Wagner et al.

(10) Patent No.: US 7,838,844 B2
(45) Date of Patent: Nov. 23, 2010

(54) RADIOPHARMACEUTICAL SYSTEM AND METHOD UTILIZING RADIO-FREQUENCY IDENTIFICATION TAGS

(75) Inventors: Gary S. Wagner, Independence, KY (US); Chad M. Gibson, Cincinnati, OH (US); Frank M. Fago, Mason, OH (US)

(73) Assignee: Mallinckrodt Inc., Hazelwood, MO (US)

( * ) Notice: Subject to any disclaimer, the term of this patent is extended or adjusted under 35 U.S.C. 154(b) by 260 days.

(21) Appl. No.: 12/067,186

(22) PCT Filed: Sep. 21, 2006

(86) PCT No.: PCT/US2006/036899
§ 371 (c)(1),
(2), (4) Date: Mar. 18, 2008

(87) PCT Pub. No.: WO2007/041017
PCT Pub. Date: Apr. 12, 2007

(65) Prior Publication Data
US 2008/0277594 A1    Nov. 13, 2008

(51) Int. Cl.
*B01D 59/44* (2006.01)
(52) U.S. Cl. .......................... 250/432 PD; 250/370.01; 250/252.1; 250/394; 250/506.1; 340/573.1; 340/539.12; 340/572.1; 340/825.49
(58) Field of Classification Search ........... 250/432 PD, 250/370.01, 252.1, 394, 506.1; 340/573.1, 340/539.12, 572.1, 825.49
See application file for complete search history.

(56) References Cited

U.S. PATENT DOCUMENTS

| | | | |
|---|---|---|---|
| 4,020,351 A | 4/1977 | Gemmill, Sr. et al. | |
| 4,020,355 A | 4/1977 | Czaplinski et al. | |
| 5,274,239 A | 12/1993 | Lane et al. | |
| 6,861,954 B2 | 3/2005 | Levin | |
| 6,877,658 B2 | 4/2005 | Raistrick et al. | |
| 2003/0160698 A1 | 8/2003 | Andreasson et al. | |
| 2003/0164401 A1 | 9/2003 | Andreasson et al. | |
| 2004/0008123 A1 | 1/2004 | Carrender et al. | |
| 2004/0238631 A1 | 12/2004 | Andreasson et al. | |
| 2005/0062603 A1 | 3/2005 | Fuerst et al. | |
| 2005/0088306 A1 | 4/2005 | Andreasson et al. | |
| 2005/0107698 A1 * | 5/2005 | Powers et al. ............... 600/436 |

FOREIGN PATENT DOCUMENTS

| | | |
|---|---|---|
| EP | 0 102 121 | 8/1983 |
| JP | 2005-258351 | 9/2005 |
| WO | WO 03/071943 A2 | 9/2003 |
| WO | WO 03-071943 A3 | 9/2003 |
| WO | WO 2004/084128 | 9/2004 |
| WO | WO 2005/118031 | 12/2005 |
| WO | WO 2006/124775 | 12/2006 |

* cited by examiner

*Primary Examiner*—Jack I Berman
*Assistant Examiner*—Meenakshi S Sahu

(57) ABSTRACT

The invention, in one characterization, may be said to be directed to a radiopharmaceutical system. In some embodiments, the system may include a radioisotope elution component and a radio-frequency identification (RFID) tag coupled to the radioisotope elution component. Other embodiments may include a radiation shielded enclosure having an interior, an exterior, and a radio-frequency identification (RFID) communication transmission passage extending between the interior and the exterior.

37 Claims, 11 Drawing Sheets

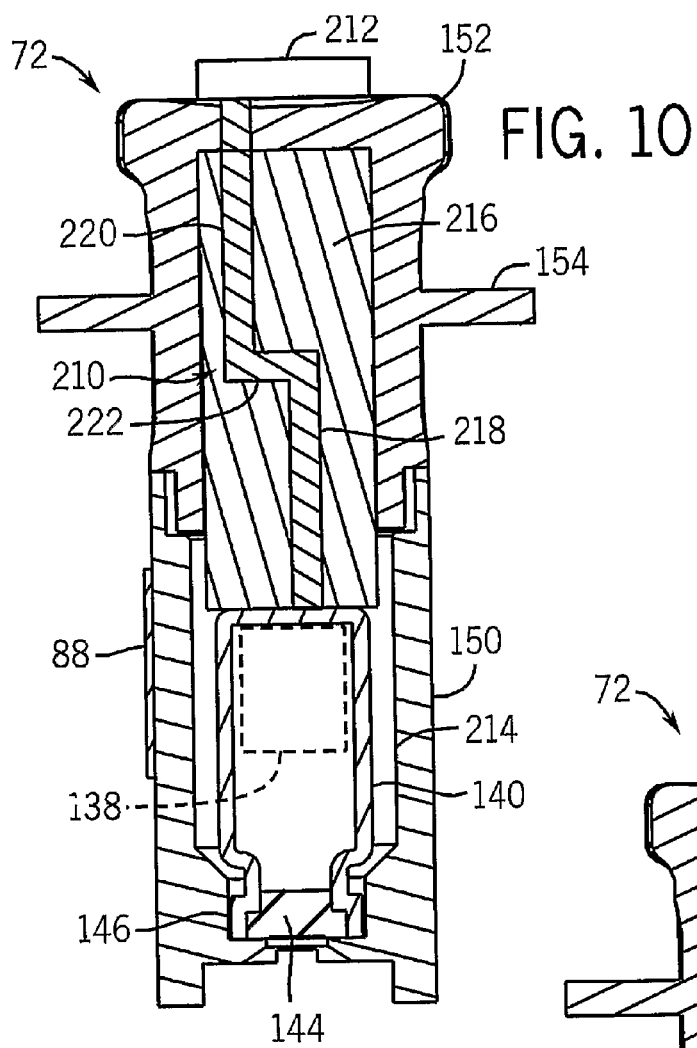
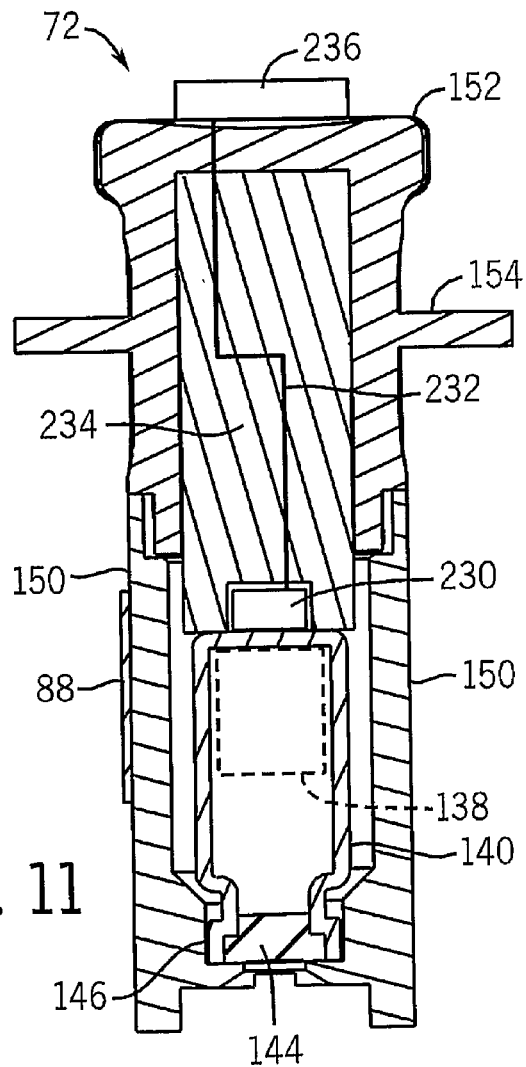

RADIOPHARMACEUTICAL SYSTEM AND METHOD UTILIZING RADIO-FREQUENCY IDENTIFICATION TAGS

FIELD OF THE INVENTION

The invention relates generally to the field of nuclear medicine. More particularly, the invention relates to managing and/or tracking information relating to at least one of a radiation shielded device (e.g., a radiopharmaceutical container or generator) and a radioactive material (e.g., radiopharmaceutical) disposed therein.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

The field of nuclear medicine utilizes radioactive material for diagnostic and therapeutic purposes by injecting a patient with an appropriate dose of the radioactive material, which tends to concentrate in certain organs or biological regions of the patient. Radioactive materials typically used in the field of nuclear medicine include Technetium-99m, Indium-111, and Thallium-201 among others. Some radioactive materials naturally concentrate toward a particular tissue, for example, iodine concentrates toward the thyroid. Other radioactive materials may be combined with a tagging or organ-seeking agent, which targets the radioactive material for the desired organ or biologic region of the patient. These radioactive materials alone or in combination with a tagging agent are typically referred to as radiopharmaceuticals in the field of nuclear medicine. At relatively lower doses of the radiopharmaceutical, a radiation imaging system (e.g., a gamma camera) provides an image of the organ or biological region that collects the radiopharmaceutical. Irregularities in the image are often indicative of a pathologic condition, such as cancer. Higher doses of the radiopharmaceutical may be used to deliver a therapeutic dose of radiation directly to the pathologic tissue, such as cancer cells.

A variety of systems and devices are used to generate, transport, dispense, and administer radiopharmaceuticals. A typical radiopharmaceutical process chain may include manufacturing/assembling a radioisotope generator assembly (i.e., a cow) containing a parent radioactive material (e.g., Molybdenum-99), transporting the radioisotope generator assembly to a radiopharmacy, eluting a daughter radioactive material (e.g., Technetium-99m) from the radioisotope generator assembly into a shielded eluate output container (e.g., a vial), extracting one or more doses from the shielded eluate output container into one or more patient dosing tools (e.g., a single dose syringe), transporting the patient dosing tool in a radioactivity shielded assembly (i.e., a pig) to a healthcare facility, and administering the single dose from the patient dosing tool into a patient. The process chain also may include mixing the one or more doses with a kit, for example, a tagging or organ-seeking agent. Moreover, the process chain may include imaging the organ that is targeted by the radiopharmaceutical, and diagnosing the patient based on the concentration/distribution of the radiopharmaceutical in that particular organ. Regarding the manufacture/assembly of the radioisotope generator assembly, the process may specifically include producing a parent radioactive material (e.g., Molybdenum-99) as a by-product of nuclear fission (e.g., uranium fission by-product) or through the use of a particle accelerator (e.g., cyclotron), binding the radioactive parent material to alumina ($Al_2O_3$) beads or a resin exchange column, encasing the alumina beads or resin exchange column in a radioactivity shielded generator, and placing the radioactivity shielded generator inside an auxiliary shield. Regarding elution, the process may specifically include supplying an eluant (e.g., a saline solution) into the radioisotope generator assembly, washing out or dissolving the daughter radioactive material from the alumina or resin exchange column into the eluant to produce an eluate, and outputting the eluate into the shielded output container.

Tracking and documentation is particularly important for the foregoing systems, devices, and steps in the process chain in view of the radioactivity, useful life, accountability, and so forth of radiopharmaceuticals. Unfortunately, radiopharmaceuticals are typically disposed inside one or more opaque radiation shielded containers during generation, transportation, dispensing and administration; thus, at least temporarily precluding direct access to the radiopharmaceutical (and information) inside the container during those steps in the process. Further, radiopharmaceuticals tend to be moved from one container to another during various steps in the process, thus adding complexity to the tracking and documentation of desired information. Typically, the tracking and documentation of information relating to radiopharmaceuticals and/or the radiation shielded containers therefor has been accomplished through hand-written records and/or manual entry of data into a computer system. Thus, the information is not readily available in association with a particular radiopharmaceutical system, device, or process. As a result, it may be difficult and/or time consuming to trace a particular radiopharmaceutical back to the original manufacturer, courier, radiopharmacy, system, or device associated with the radiopharmaceutical.

SUMMARY

The present invention, in certain embodiments, is directed to radio-frequency identification (RFID) tags disposed on one or more radiopharmaceutical devices, such as containers, radiation shields, radioisotope generators, and radioisotope elution systems. Specifically, in some embodiments, a RFID tag may be coupled to a radioisotope generator, an eluant supply container, an eluate output container, or one or more radiation shields disposed about one or more of these components. In some embodiments, a RFID communication transmission passage may extend through a radiation shielding material, such as a wall, cover, or other portion of a radiation shield or enclosure. In addition, some embodiments of the RFID communication transmission passage may have a path that is curved or angled in multiple directions one after another. Moreover, some embodiments of the RFID communication transmission passage may be formed of a magnetic material.

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of features and aspects that may not be set forth below.

In accordance with a first aspect of the present invention, there is provided a radiopharmaceutical system that may include a radioisotope elution component and a radio-frequency identification (RFID) tag coupled to the radioisotope elution component. Herein, a "radioisotope elution component" generally refers to any component designed to be used in a radioisotope elution procedure (e.g., a radiation-shielded component or any component that is to be disposed in or even interconnected with a radiation-shielded structure during a at least a portion of a radioisotope elution procedure). For example, in certain embodiments discussed in detail below, the component may include a radioisotope generator, an eluant supply container, an eluant output container, a radiation-shielded structure, or a combination thereof.

In accordance with a second aspect of the present invention, there is provided a radiopharmaceutical system that may include a radioisotope generator assembly and a radio-frequency identification (RFID) tag disposed on a portion of the radioisotope generator assembly.

In accordance with a third aspect of the present invention, there is provided a radiopharmaceutical system that may include a radiation shielded enclosure having an interior, an exterior, and a radio-frequency identification (RFID) communication transmission passage extending between the interior and the exterior.

In accordance with a fourth aspect of the present invention, there is provided a radiopharmaceutical system that may include an eluate output assembly and a radio-frequency identification (RFID) tag disposed on a portion of the eluate output assembly. The eluate output assembly may include a radiation shielded enclosure, an evacuated eluate output container, and a radioisotope generator fluid coupling. In certain embodiments, the phrase fluid coupling may refer to a mechanism to join a first component to a second component, or to join one or more components that may be connected with the second component, or to join a first component to a part of a system that includes a second component, such that the molecules of a substance(s) (e.g., a liquid or gas) may be substantially contained within the system while being capable of flowing through the system including the first and second components. For example, the radioisotope generator fluid coupling may include one or more mechanisms of the evacuated eluate output container and/or a radioisotope generator, wherein the mechanisms are configured to enable exchange or flow of a substance (e.g., a gas or liquid) between the evacuated eluate output container and the radioisotope generator.

In accordance with a fifth aspect of the present invention, there is provided a method that may include supplying an eluant into a radioisotope generator of a radioisotope elution system, eluting a radioisotope in the radioisotope generator, outputting an eluate from the radioisotope generator, and communicating data with one or more radio-frequency identification (RFID) tags disposed on one or more components of the radioisotope elution system.

Various refinements exist of the features noted above in relation to the various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of the present invention without limitation to the claimed subject matter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 10 is a cross-sectional side view of an alternative embodiment of the eluate output assembly of FIG. 3, illustrating a RFID communication transmission passage extending through the eluate output assembly between a head having a RFID read/write device and an internal cavity containing an eluant output container with a RFID tag;

FIG. 11 is a cross-sectional side view of an alternative embodiment of the eluate output assembly of FIG. 3, illustrating RFID wiring extending through the eluate output assembly between a RFID read/write device disposed on a head and a RFID read/write device disposed in an internal cavity containing an eluant output container with a RFID tag;

DETAILED DESCRIPTION OF SPECIFIC EMBODIMENTS

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
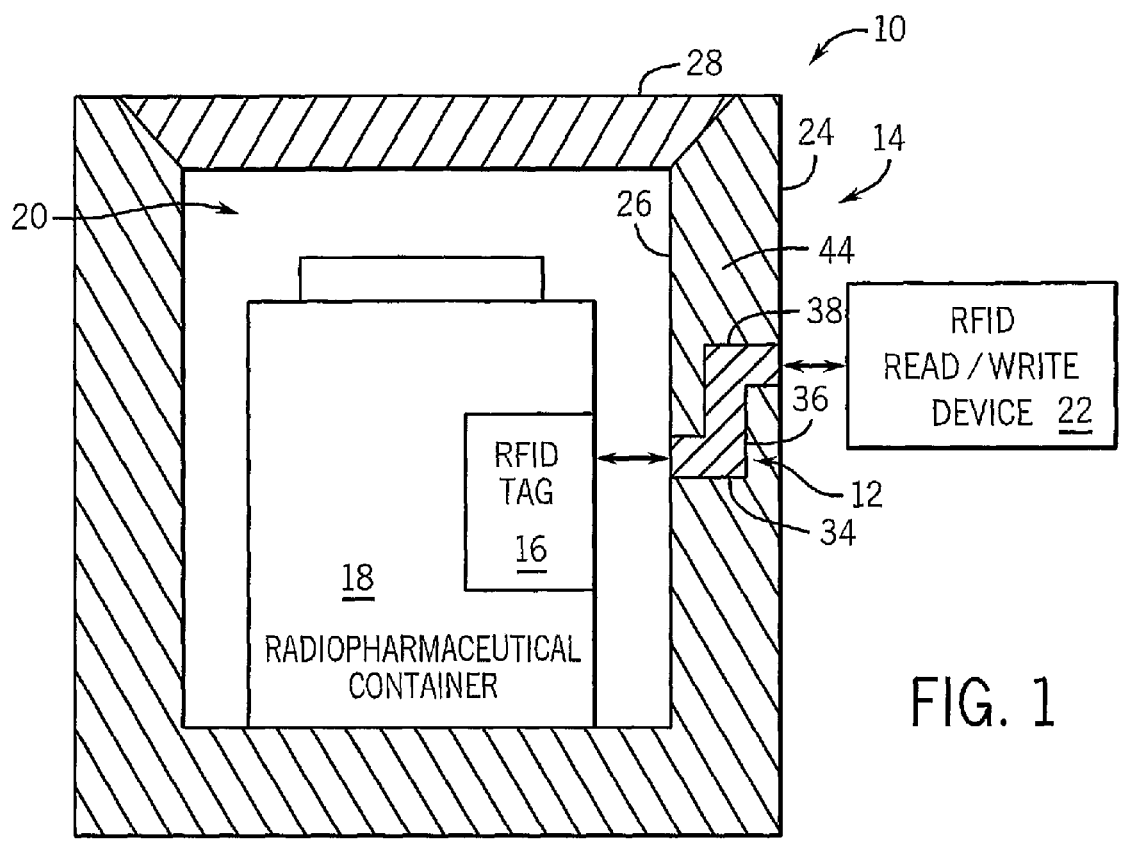
FIG. 1 is a diagrammatical view of an exemplary embodiment of a radiation shielded communication system having a radio-frequency identification (RFID) communication transmission passage extending through a radiation shielded enclosure.

FIG. 1 shows an exemplary radiation shielded communication system 10 having a radio-frequency identification (RFID) communication transmission passage or path 12 extending through a radiation shielded enclosure 14. A RFID tag 16 may be disposed on a radiopharmaceutical container 18 within a closed cavity 20 of the radiation shielded enclosure 14, while a RFID read/write device 22 may be disposed outside of the radiation shielded enclosure 14. The radiopharmaceutical container 18 may include (e.g., house) a variety of containers or devices for supplying, generating, processing, dispensing, transporting, or medically administering radiopharmaceuticals associated with nuclear medicine. For example, the radiopharmaceutical container 18 may include a vial, a syringe, a radioisotope generator, or another container for radiopharmaceuticals. As discussed in further detail below, the RFID read/write device 22 is communicative with the RFID tag 16 via the RFID communication transmission passage or path 12, which may facilitate communication and information exchange between the RFID tag 16 and the RFID read/write device 22 in a configuration that may substantially block or contain radioactivity within the radiation shielded enclosure 14. For example, the RFID communication transmission passage 12 may be formed of a material or have a geometry that enables passage of RFID signals while substantially disabling passage of radioactivity rays.

The RFID tag 16, the RFID read/write device 22, and the RFID communication transmission passage 12 may improve information management and tracking associated with radiopharmaceuticals and various radiopharmaceutical systems and devices. For example, the RFID techniques described in detail below may improve tracking or traceability of various radioactive products, increase efficiency or accuracy of radiopharmaceutical processes (e.g., radioisotope elution, nuclear medicine imaging, etc.), and so forth. In certain embodiments, the disclosed RFID techniques may involve storing, accessing, modifying, or exchanging data including origination or manufacturing data, product specifications data, material characteristics data, procedure protocols or instructions, historical or current process data, historical or current shipping/tracking data, customer order data, patient data, and so forth. For example, the origination or manufacturing data may include part numbers, serial numbers, lot numbers, batch numbers, factory identifiers, country identifiers, machine identifiers, worker identifiers, dates, and other data relating to the original production, assembly, or creation of the particular item. The material characteristics data may include material compositions, radioactivity levels, half-life, and/or remaining useful life. The procedure or process data may include calibration data, elution process data, nuclear medicine process data, imaging data, and/or other similar data.

In view of embodiments discussed in detail below, the data may include radioisotope generator data, radiation shield data, eluant data, eluate data, elution process data, tagging agent data, and/or other data associated with components or procedures of a radioisotope elution system. For example, the radioisotope elution data may include radioactivity level, time of elution process, duration of elution process, identity of radioisotope generator used in elution process, identity of eluate output container used in elution process, size of eluate output container used in elution process, and/or vacuum level of eluate output container. The data stored on the various RFID tags may be used locally at a particular site or facility, and/or the data may be shared between various entities. For example, the data may be exchanged between entities via a network, and/or the data may be exchanged as the item having the RFID tag is shipped among the various entities.

In certain embodiments, the RFID tag 16 may include a variety of active or passive transponders having an integrated circuit with radio-frequency (RF) circuitry and memory for data storage. An active RFID tag 16 may include an internal battery for self-powering the circuitry, whereas a passive RFID tag 16 may obtain power from the RFID read/write device 22. In contrast to an active RFID tag 16, a passive RFID tag 16 may have a relatively smaller and lighter form, a longer lifespan, and a shorter communication range. In some embodiments, the RFID tag 16 may be an inductively coupled RFID tag 16 having a silicon microprocessor, a metal coil configured to function as an antenna, and an encapsulating material (e.g., glass or polymer) that wraps around the microprocessor and the coil. An inductively coupled RFID tag 16 may be powered by the magnetic field generated by the RFID read/write device 22. For example, the metal coil of the inductively coupled RFID tag 16 may receive the magnetic energy and communicate data with the RFID read/write device 22. In other embodiments, the RFID tag 16 may be a capacitively coupled RFID tag 16 having a silicon microprocessor, conductive carbon ink configured to function as an antenna, and paper having an adhesive (e.g., a paper label). For example, the microprocessor may be attached to printed carbon-ink electrodes on an adhesive label. The capacitively coupled RFID tag 16 may be relatively more flexible and lower cost than the inductively coupled RFID tag 16.

The RFID read/write device 22 may include a variety of transceivers configured to transmit and receive electromagnetic or electrostatic signals in the radio-frequency (RF) portion of the electromagnetic spectrum. The range between the RFID tag 16 and the RFID read/write device 22 may vary according to a number of factors, including the frequency, medium, and so forth. In some alternative embodiments, the RFID read/write device 22 may be replaced by one or more devices, wherein each of the devices is capable of only reading from or only writing to the RFID tag 16. In other alternative embodiments, the tag 16 and read/write device 22 may include another form of dedicated short range communication (DSRC) or smart tag technology.

The RFID communication transmission passage 12 may be defined in one or more locations through the radiation shielded enclosure 14. In certain embodiments, the RFID communication transmission passage 12 may be positioned in close proximity to the height or general position of the RFID tag 16 disposed on the radiopharmaceutical container 18. In this close position, the RFID read/write device 22 may communicate more efficiently with the RFID tag 16 via the RFID communication transmission passage 12. The RFID communication transmission passage 12 may have a path that routes the electromagnetic energy to a region of the enclosure 14 further away from the primary source of radiation. For example, if the primary source of gamma radiation is near the bottom of the enclosure 14, then the RFID communication transmission passage may extend toward the top of the enclosure 14.

Still referring to FIG. 1, the RFID communication transmission passage 12 may be disposed in what may be characterized as a cup-shaped portion 24 of the radiation shielded enclosure 14. The cup-shaped portion 24 may include a receptacle 26, such as a cylindrical receptacle, having an opening covered by a lid or cover portion 28. Alternatively, the RFID communication transmission passage 12 may be disposed in the lid or cover portion 28. The cover portion 28 may generally remain over the receptacle 26 (e.g., cover an opening into the receptacle) to substantially prevent radiation from escaping the enclosure 14 through the opening in the receptacle 26. Thus, the cup-shaped portion 24 and cover portion 28, in combination, may be utilized to substantially limit radioactivity exposure in situations involving the use of the radiopharmaceuticals. For example, the radiopharmaceutical container 18 may remain enclosed within the radiation shielded enclosure 14 for storage or transportation to reduce the likelihood of radioactivity exposure.

In certain embodiments, a user may wish to access, store, modify, or generally exchange data associated with the radiopharmaceutical container 18 via the RFID tag 16 and the RFID read/write device 22. For example, it may be desirable to store and access data directly with the radiopharmaceutical container 18 (e.g., to increase efficiency or accuracy of processes involving manufacturing, shipping/tracking, radioisotope elution, or nuclear medicine among others). If the cover portion 28 or the radiopharmaceutical container 18 is removed from the radiation shielded enclosure 14, then the RFID read/write device 22 may communicate and exchange information with the RFID tag 16 disposed on the container 18. However, if the radiopharmaceutical container 18 is enclosed inside the closed cavity of the radiation shielded enclosure 14, then the RFID communication transmission passage 12 may facilitate communication and information exchange between the RFID tag 16 and the RFID read/write device 22 in a manner that reduces the likelihood of radioactivity escaping from the radiation shielded enclosure 14. For example, the geometry, material composition, and other characteristics of the RFID communication transmission passage 12 may permit effective RFID communications, while reducing the likelihood of radioactivity rays escaping through the passage 12.

Figure 2:
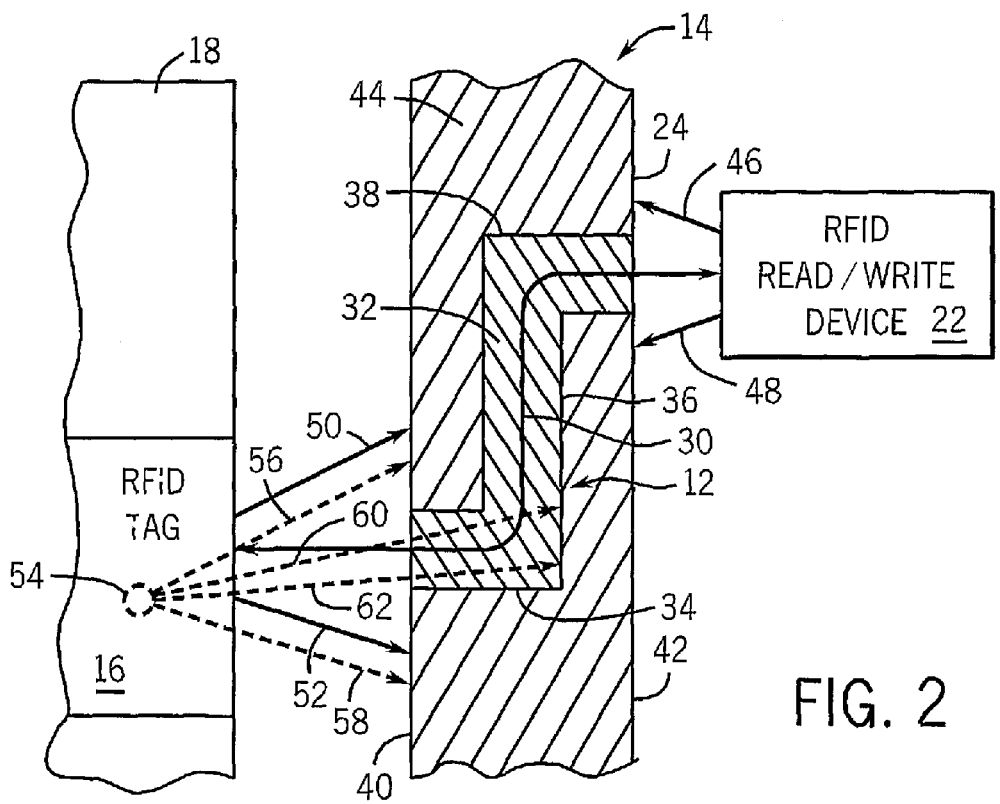
FIG. 2 is a partial diagrammatical view of the radiation shielded communication system of FIG. 1, illustrating a communication signal passing through the RFID communication transmission passage between a RFID read/write device disposed outside the radiation shielded enclosure and a RFID tag disposed inside the radiation shielded enclosure.

FIG. 2 shows a communication signal (e.g., electromagnetic or electrostatic) or a data exchange 30 that may pass through the RFID communication transmission passage 12 between the RFID tag 16 and the RFID read/write device 22. The RFID communication transmission passage 12 may include a variety of radio-frequency transmissive materials, such as a ferrous or other magnetic material 32. The magnetic material 32 may facilitate the channeling of the communication signal 30 (e.g., electromagnetic or electrostatic) through the radiation shielded enclosure 14 by providing a path of lower resistance (e.g., low reluctance path). In this manner, the RFID communication transmission passage 12 may route or flow the electromagnetic energy similar to the flow of water through a pipe.

An orientation of the RFID communication transmission passage 12 may vary through multiple angles, curves, or directions one after another along the path 12, such that radioactivity rays may be substantially blocked or terminated before reaching the exterior of the radiation shielded enclosure 14. For example, the RFID communication transmission passage 12 may include an inner horizontal path 34, an intermediate vertical path 36, and an outer horizontal path 38. In other words, the inner and outer horizontal paths 34 and 38 may be substantially perpendicular to inner and outer surfaces 40 and 42 of the cup-shaped portion 24 of the radiation shielded enclosure 14, whereas the intermediate vertical path 36 may be substantially parallel with and between the inner and outer surfaces 40 and 42 of the cup-shaped portion 24. However, a variety of other geometries and configurations may be used in other embodiments of the RFID communication transmission passage 12. For example, the geometry of the RFID communication transmission passage 12 may curve, bend, zigzag, and/or generally change directions through the cup-shaped portion 24, such that the changing directions may block radioactivity rays. More generally, the geometry of the RFID communication transmission passage 12 in some embodiments may be said to be non-linear and/or non-planar. In some embodiments, the interior surface of the RFID communication transmission passage 12 may have a surface texture, such as a pattern of peaks and valleys, which may block radioactivity rays striking the interior surface. However, other embodiments of the RFID communication transmission passage 12 may have a smooth interior surface and extend straight through the radiation shielded enclosure 14. For example, the RFID communication transmission passage 12 may be shaped as a sort of bar or cylinder.

Still referring to FIG. 2, the magnetic material 32 of the RFID communication transmission passage 12 enables the communication signal 32 to flow or pass freely between the inner and outer surfaces 40 and 42, whereas a radiation shielding material 44 of the radiation shielded enclosure 14 blocks signals or communications from the RFID read/write device 22 and the RFID tag 16 as illustrated by arrows 46, 48, 50, and 52. Similarly, the radiation shielding material 44 of the radiation shielded enclosure 14 may generally block radioactivity from a radioactivity source 54 as indicated by dashed arrows 56, 58, 60, and 62. In certain embodiments, the radiation shielding material 44 may include led, tungsten, depleted uranium, or other suitable shielding materials. Although the magnetic material 32 of the RFID communication transmission passage 12 enables multidirectional passage of the RFID communication signal 30, the radioactivity arrays 60 and 62 from the radioactivity source 54 generally propagate in a linear direction despite the magnetic material 32. The magnetic material 32 may provide some radiation shielding against the radioactivity rays 60 and 62, while the intermediate vertical path 36 may reduce the likelihood that the radioactivity rays 60 and 62 can pass any further than the inner horizontal path 34. In other embodiments, the RFID communication transmission passage 12 may have other geometrical or multidirectional paths, such as an L-shape, an M-shape, an N-shape, an S-shape, a U-shape, a V-shape, a W-shape, or a Z-shape. Moreover, certain embodiments may include a plurality of passages in various portions of the radiation shielded enclosure 14. Again, the RFID communication transmission passage 12 may be positioned or routed away from the primary source of radiation to reduce the likelihood of radiation escape from the enclosure 12. Thus, the length of the intermediate vertical path 36 may be extended (e.g., a substantial portion of the height of the enclosure 14) to increase the distance between the radiation source and the outer horizontal path 38.

Figure 3:
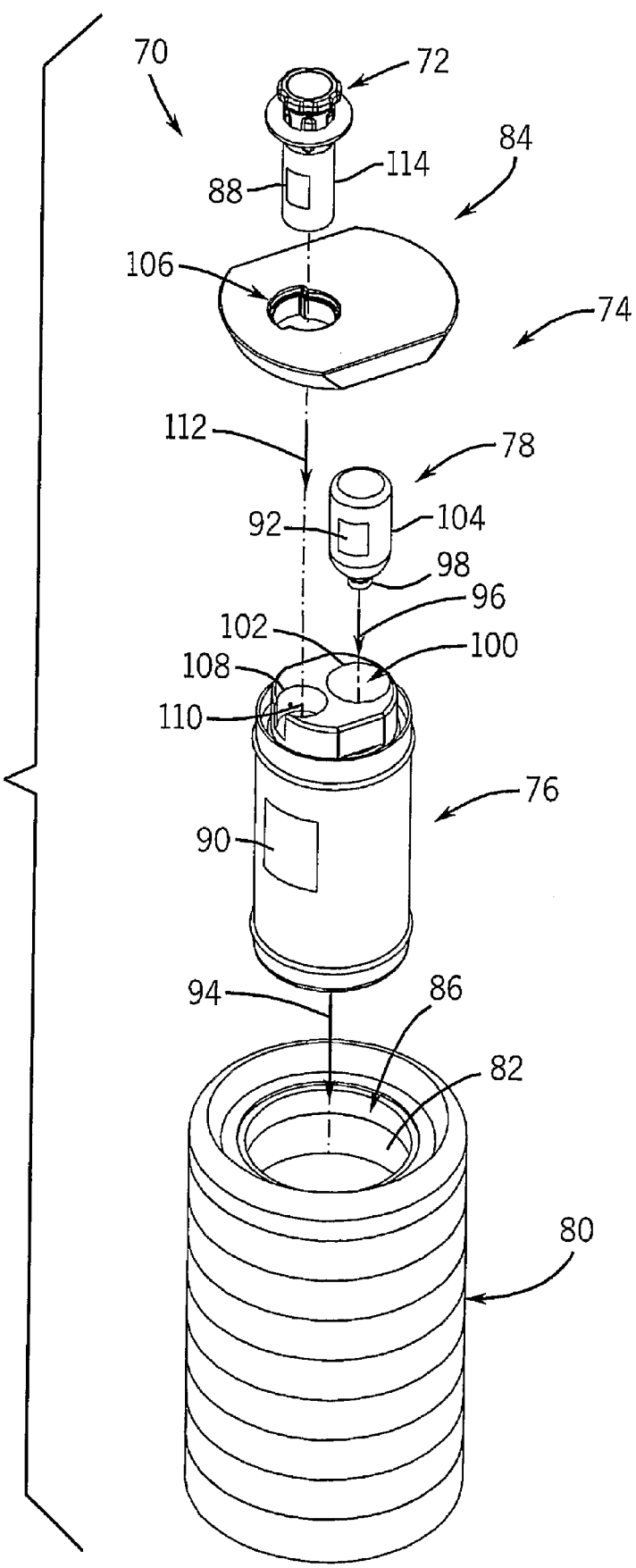
FIG. 3 is an exploded perspective view of an exemplary embodiment of a radioisotope elution system having RFID tags disposed on a radioisotope generator, an eluant supply container, and an eluate output assembly.

FIG. 3 shows an exemplary radioisotope elution system 70 that may have RFID tags disposed on various components in accordance with certain embodiments of the present technique. The radioisotope elution system 70 may include an eluate output assembly 72 and a radioisotope generator assembly 74. The illustrated radioisotope generator assembly 74 may include a radioisotope generator 76, an eluant supply container 78, and an auxiliary radiation shield 80 having an interior cavity or recess 82 and a cover 84 that fits over an opening 86 in the shield 80. In the illustrated embodiment, the radioisotope elution system 70 may include a RFID tag 88 disposed on the eluate output assembly 72, a RFID tag 90 disposed on the radioisotope generator 76, and a RFID tag 92 disposed on the eluant supply container 78. However, additional RFID tags may be incorporated onto other components of the radioisotope elution system 70. Moreover, a variety of RFID read and/or write devices, as well as various communication techniques, may be incorporated into the radioisotope elution system 70 to facilitate data exchange relating to the various components.

Referring again to FIG. 3, the radioisotope generator 76 may be lowered into the recess 82 of the auxiliary radiation shield 80 as illustrated by arrow 94. Similarly, a head 98 of the eluant supply container 78 may be lowered onto a hollow output needle 100 within an input recess 102 of the radioisotope generator 76, as illustrated by arrow 96. In certain embodiments, the input recess 102 may have a geometry with dimensions that closely match an exterior 104 of the eluant supply container 78, such that the eluant supply container 78 may be guided in a generally centered position downwardly toward the hollow input needle 100. In some embodiments, the cover 84 may be lowered over the opening 86 after installing the radioisotope generator 76 and the eluant supply container 78 within the interior cavity or cylindrical recess 82 of the auxiliary radiation shield 80. As noted above, the assembly without the eluate output assembly 72 may be referred to as the radioisotope generator assembly 74. In addition, the radioisotope generator assembly 74 may include a radiation shielded plug disposed in a passage 106 in the cover 84 during storage or transportation of the radioisotope generator assembly 74.

In the illustrated embodiment of FIG. 3, the eluate output assembly 72 may be coupled with the radioisotope generator 76 through the passage 106 in the cover 84 (e.g., upon removal of the radiation shielded plug (not shown)). For example, the passage 106 in the cover 84 may be substantially aligned with an output recess 108 in the radioisotope generator 76. Similar to the input recess 102, the output recess 108 may include a hollow output needle 110 in a generally centered position within the output recess 108. If an eluate is desired from the radioisotope generator 76, then the radiation shielded plug may be removed and replaced with the illustrated eluate output assembly 72. Accordingly, the eluate output assembly 72 may be lowered at least partially through the passage 106 into the auxiliary radiation shield 80 into engagement with the hollow output needle 110 in the radioisotope generator 76, as indicated by arrow 112. Similar to the input recess 102, the output recess 108 may have a geometry with dimensions that fit closely with a exterior 114 of the eluate output assembly 72, such that the eluate output assembly may be guided in a generally centered direction into engagement with the hollow output needle 110.

Figure 4:
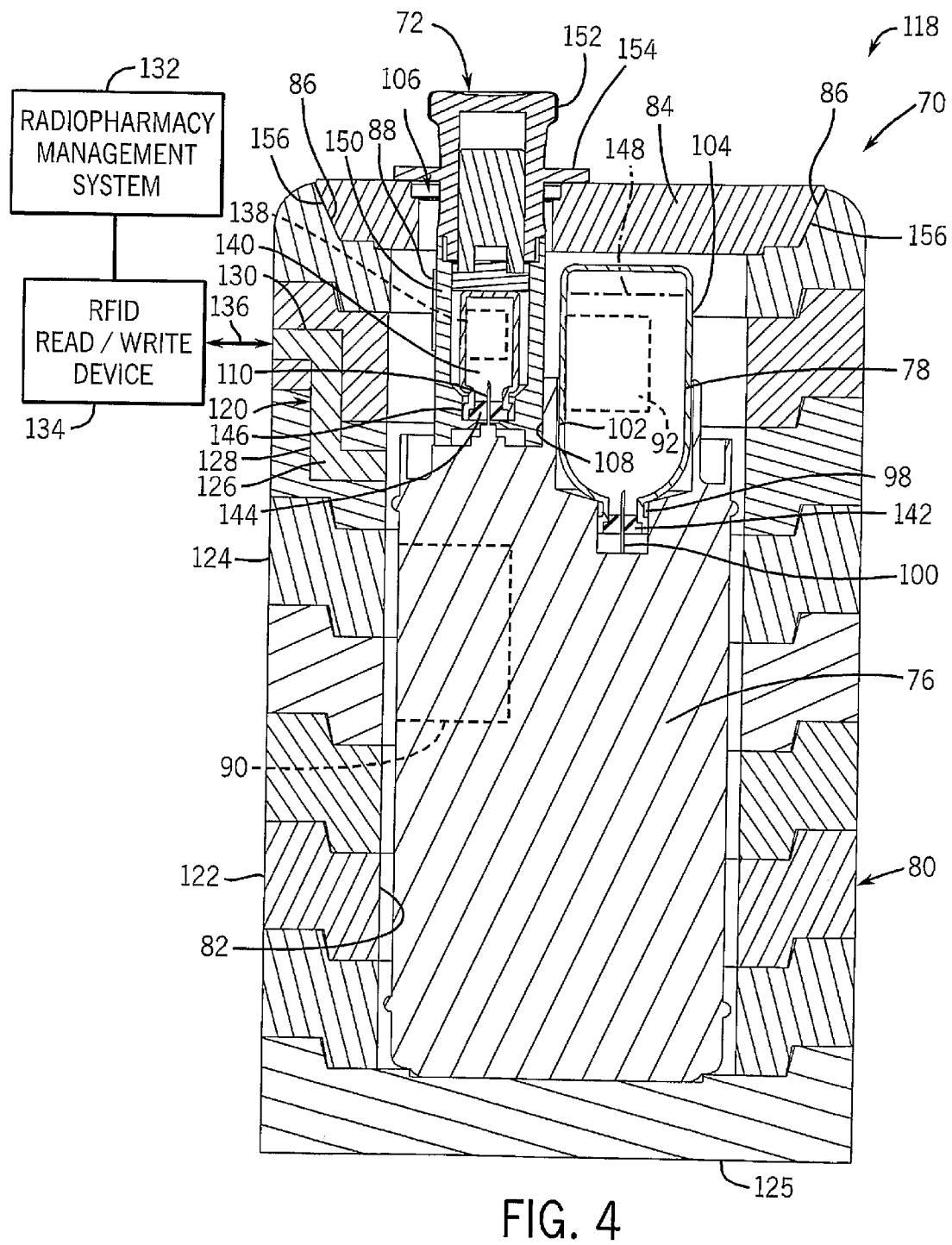
FIG. 4 is a cross-sectional side view of an embodiment of the radioisotope elution system of FIG. 3, illustrating a RFID communication transmission passage extending through an auxiliary radiation shield disposed about the radioisotope generator, the eluant supply container, and a substantial portion of the eluate output assembly.

FIG. 4 shows an exemplary radiopharmacy or radiopharmaceutical information system 118 including the radioisotope elution system 70. As shown, a RFID communication transmission passage 120 may extend through a portion of the auxiliary radiation shield 80 between the interior cavity 82 and an exterior 122. In this exemplary embodiment, the auxiliary radiation shield 80 includes a plurality of stepped annular structures or rings 124 disposed one over the other above a base 125. Although the RFID communication transmission passage 120 may have a variety of geometries and configurations, the illustrated passage 120 has an inner horizontal path 126, an intermediate vertical path 128, and an outer horizontal path 130. The illustrated paths 126, 128, and 130 may extend through one or more of the rings 124. As illustrated, the inner horizontal path 126 is disposed in one ring 124 while the outer horizontal path 130 is disposed in an adjacent ring 124, and the intermediate vertical path extends through both of the adjacent rings 124 to connect the horizontal paths 126 and 130. In alternative embodiments, the RFID communication transmission passage 120 of FIG. 4 may have a variety of other straight, angled, curved, or generally multidirectional (e.g., non-linear) geometries, which may reduce the likelihood of allowing a radioactivity ray to pass through the passage 120. In addition, the RFID communication transmission passage 120 also may be formed of a variety of ferrous, magnetic, or other materials, which provide a path of lower resistance (e.g., low reluctance path) that may enable effective passage of electromagnetic energy or signals through the auxiliary radiation shield 80.

The radiopharmaceutical information system 118 of FIG. 4 may include a radiopharmacy management system 132 communicatively coupled to a RFID communication device, e.g., RFID read/write device 134 (or other appropriate device capable of electromagnetically and/or electrostatically reading data from and/or writing data to a data tag). In other words, the RFID communication device, e.g., read/write device 134, may only read, or only write, or both read and write data on a RFID tag. Thus, the terms RFID communication device and RFID read/write (R/W) device may be used interchangeably throughout the following discussion and claims. Moreover, in the disclosed embodiments, the phrase communicatively coupled may include wireless and/or wired connections and/or communications between the respective systems or devices. For example, communicatively coupled systems or devices may be directly connected via optical cables, insulated conductors, and so forth. By further example, the communicatively coupled systems or devices may exchange data via infrared signals, radio frequency (RF) signals, or another suitable wireless technology.

The RFID read/write device 134 may be disposed in the vicinity of the RFID communication transmission passage 120. As discussed above with reference to FIGS. 1 and 2, the RFID read/write device 134 of FIG. 4 may communicate signals and exchange data 136 through the RFID communication transmission passage 120 with the RFID tags 88, 90, and 92 disposed on the eluate output assembly 72, the radioisotope generator 76, and the eluant supply container 78, respectively. In addition, as discussed in further detail below, the RFID read/write device 134 may communicate signals and exchange data 136 through the passage 120 with a RFID tag 138 disposed on an eluate output container 140 disposed inside the eluate output assembly 72. In this manner, the radiopharmacy management system 132 can exchange the data 136 with the various components (e.g., the eluate output assembly 72, the eluate output container 140, the radioisotope generator 76, and the eluant supply container 78) throughout various stages of transportation, production, and eventual nuclear medicine procedures.

Still referring to FIG. 4, the radioisotope generator 76 may be fluidly coupled with the eluant supply container 78 and the eluate output assembly 72 to enable fluid circulation for a radioisotope elution process. For example, the eluant supply container 78 may be fluidly coupled to the hollow input needle 100 of the radioisotope generator 76 and the eluate output assembly 72 may be fluidly coupled to the hollow output needle 110 of the radioisotope generator 76. In certain embodiments, the eluate supply container 78 and the eluate output container 140 may include a radioisotope generator fluid coupling, such as a male or female connector, which is configured to mate with the radioisotope generator 76 to enable fluid exchange. The phrases fluidly coupled or fluid coupling may include a variety of conduits, tubing, male connectors, female connectors, intermediate conduits or devices, such that fluid can pass between the respective systems or devices (e.g., between the containers 78 and 140 and the radioisotope generator 76). Specifically, the illustrated hollow input needle 100 may be pierced though a flexible insert 142, such as a rubber septum or another suitable radioisotope generator fluid coupling, in the head 98 of the eluant supply container 78. Similarly, the hollow output needle 110 may be pierced through a flexible insert 144, such as a rubber septum or another suitable radioisotope generator fluid coupling, in a head 146 of the eluate output container 140 inside the eluate output assembly 72. The eluant supply container 78 may be pre-filled with a quantity of an eluant 148, such as a saline solution. Initially, the eluate output container 140 may be evacuated to provide a vacuum condition inside the container 140, thereby creating a pressure differential between the eluant supply container 78 and the eluate output container 140.

If an eluate is desired from the radioisotope elution system 70 of FIG. 4, then one or more valves or other triggering mechanisms may be engaged to circulate the eluant 148 through the radioisotope generator 76 from the eluant supply container 78 to the eluate output container 140. During an elution process, the eluant 148 may enter the radioisotope generator 76 through one or more of the hollow input needles 100, circulate throughout the radioisotope generator 76 to wash out or extract a desired radioisotope (e.g., Technetium-99m), and then output an eluate through the hollow output needle 110 into the eluate output container 140.

For example, some embodiments of the radioisotope generator 76 include a radiation shielded outer casing (e.g., lead shell) that encloses a radioactive parent, such as molybdenum-99, adsorbed to the surfaces of beads of alumina or a resin exchange column. Inside the radioisotope generator 76, the parent molybdenum-99 transforms, with a half-life of about 67 hours, into metastable technetium-99m. The daughter radioisotope, e.g., technetium-99m, is generally held less tightly than the parent radioisotope, e.g., molybdenum-99, within the radioisotope generator 76. Accordingly, the daughter radioisotope, e.g., technetium-99m, can be extracted or washed out with a suitable eluant 148, such as an oxidant-free physiologic saline solution. The eluate output from the radioisotope generator 76 into the eluate output container 140 generally includes the eluant 148 and the washed out or eluted radioisotope from within the radioisotope generator 76. Upon receiving the desired amount of eluate within the eluate output container 140, the valves or triggering mechanisms can be closed or disengaged to terminate the circulation. As discussed in further detail below, the extracted daughter radioisotope can then, if desired, be combined with a tagging agent to facilitate diagnosis or treatment of a patient (e.g., in a nuclear medicine facility).

The eluate collected in the eluate output container 140 includes the extracted radioisotope and the eluant. Accordingly, the eluate output assembly 72 may have a hollow radiation shielded body 150 disposed about the eluate output container 140, thereby facilitating containment of the radioactivity emitted from the eluate therein. In addition, an upper head 152 of the eluate output assembly 72 may include a cylindrical flange 154 that extends across the passage 106 in the cover 84. The cover 84 may have a wedge-shaped perimeter or multi-angled interface with the opening 86 in the auxiliary radiation shield 80. For example, as illustrated in FIG. 4, the cover 84 may have a partially conical or angled interface 156 with the opening 86 in the auxiliary radiation shield 80. The cylindrical flange 154 and interface 156 may provide further containment of the radioactivity inside the auxiliary radiation shield 80.

The RFID tags 88, 90, 92, and 138 may include a variety of data as mentioned above. In certain embodiments, the data is specific to the particular component or device. In certain embodiments, the data includes information pertaining to an elution process, a nuclear medicine procedure, a tagging agent, a patient, a medical diagnosis, or other associated information. For example, the RFID tag 88 may include a variety of data relating to the eluate output assembly 72, such as shield material, shield size, container volume, vacuum level, history of use, specifications, unique identifier, shipment information, manufacturing information, and other desired data. For example, the data may include volume and radioactivity level/concentration of an eluate collected in the eluate output assembly 72. The RFID tag 90 may include a variety of data relating to the radioisotope generator 76, such as shield material, shield size, history of use, specifications, unique identifier, shipment information, manufacturing information, radioactivity level, time of last elution process, duration of last elution process, remaining useful life, and other desired data. The RFID tag 92 may include a variety of data relating to the eluant supply container 78, such as container volume, starting eluant quantity, remaining eluant quantity, history of use, specifications, unique identifier, shipment information, manufacturing information, and other desired data. The RFID tag 138 may include a variety of information similar to that described in relation to the RFID tag 72.

The foregoing data, among other information, may be used by some to improve one or more of product tracking, process efficiency, and documentation/records relating to the various systems, processes, and devices. In certain embodiments, the RFID stored data may be used with an information management system, such as the radiopharmacy management system 132, to automate various aspects of processes and systems. For example, the RFID stored data may facilitate planning or scheduling of the most efficient time, volume, and concentration to elute for each radioisotope generator 76. This planning and scheduling may be based on data relating to the size and remaining activity of the radioisotope generator(s) 76, the volume of the last elution for the radioisotope generator(s) 76, the amount of time that has passed since the last elution on the radioisotope generator(s) 76, and the performance data from previous elution processes. An information management system, e.g., system 132, may use the RFID stored data to create reminders or notifications to prompt staff to perform an elution process, including data relating to the desired radioisotope generator 76 and the procedural steps of the particular elution process. The information management system, e.g., system 132, may use the RFID stored data to improve partial elution processes, for example, by indicating the proper duration or start/stop times for the elution process. The RFID stored data may enable performance analysis and reliability traceability associated with a specific radioisotope generator 76 and related elution components.

Figure 5:
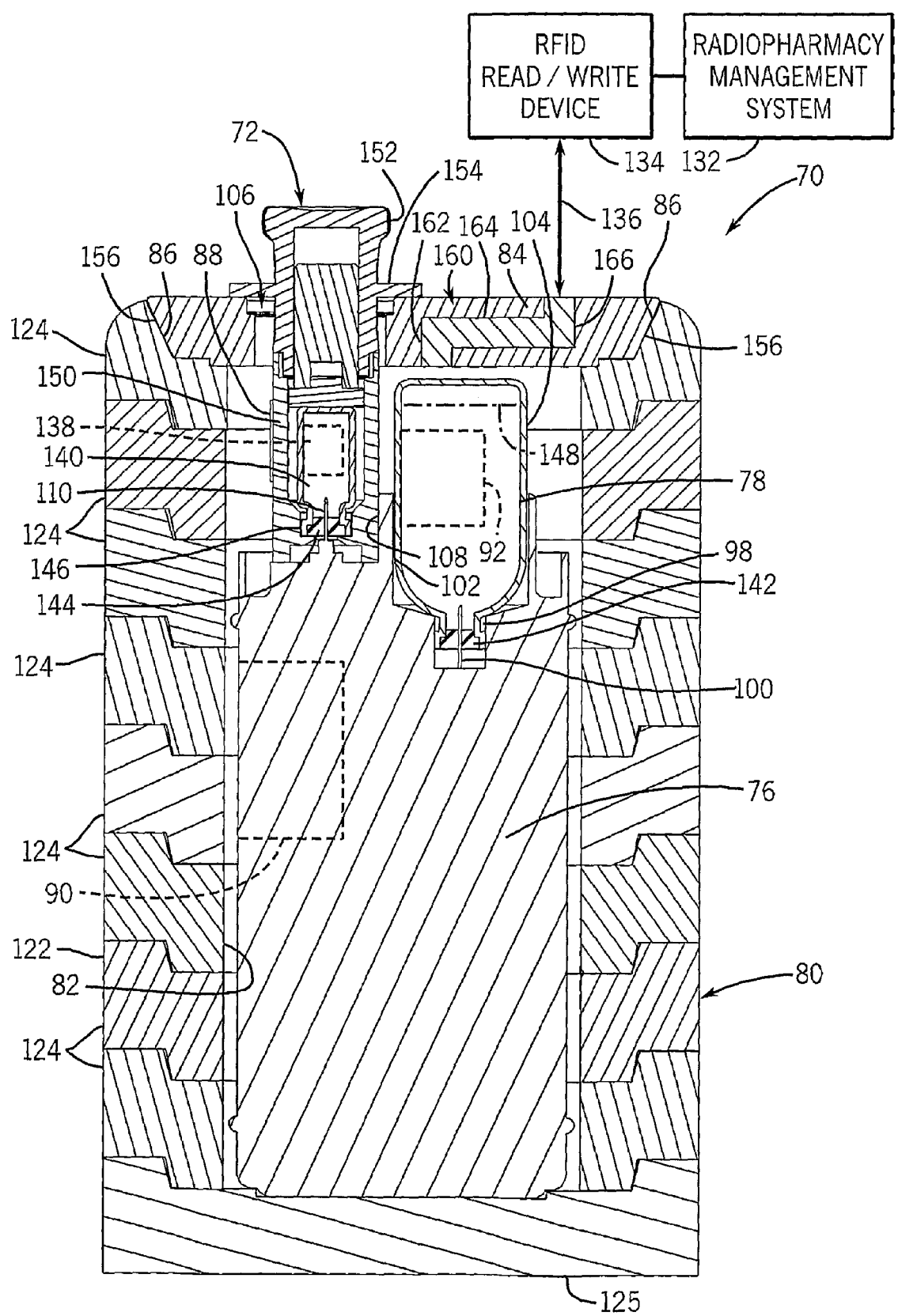
FIG. 5 is a cross-sectional side view of another embodiment of the radioisotope elution system of FIG. 3, illustrating a RFID communication transmission passage extending through a cover of an auxiliary radiation shield disposed about the radioisotope generator, the eluant supply container, and a substantial portion of the eluate output assembly.

FIG. 5 shows an alternative embodiment of the radioisotope elution system 70 of FIG. 3 illustrating a RFID communication transmission passage 160 extending through the cover 84 in the auxiliary radiation shield 80. In this exemplary embodiment, the RFID communication transmission passage 160 may include an inner vertical path or passage 162, an intermediate horizontal path or passage 164, and an outer vertical path or passage 166. In this non-linear or multidirectional geometry of the passage 160, the radioactive shielding material of the cover 84 may block radioactivity from the generator 76 and the eluate output assembly 72 while permitting communication signals or data exchange between the RFID read/write device 134 and the RFID tags 88, 90, 92, and 138. Again, as discussed above, the radioactivity rays tend to propagate in a linear direction. The magnetic material of the RFID communication transmission passage 160 may block at least some of the radioactivity in the inner vertical path or passage 162, while the multidirectional configuration of the passage 160 may further reduce the likelihood of the generally linear rays of radioactivity from passing any further through the cover 84. In other words, the generally linear rays of radiation may be unable to pass through the intermediate horizontal path or passage 164 and the outer vertical path or passage 166. In contrast, the magnetic material of the RFID communication transmission passage 160 enables the communication signals or data exchange 136 to pass multidirectionally through the cover 84. In other embodiments, the RFID communication transmission passage 160 may include other configurations and geometries, such multidirectional shapes in the form of an L, M, N, S, U, V, W, or Z. Moreover, some embodiments may include a plurality of the RFID communication transmission passages 120 and/or 160.

Figure 6:
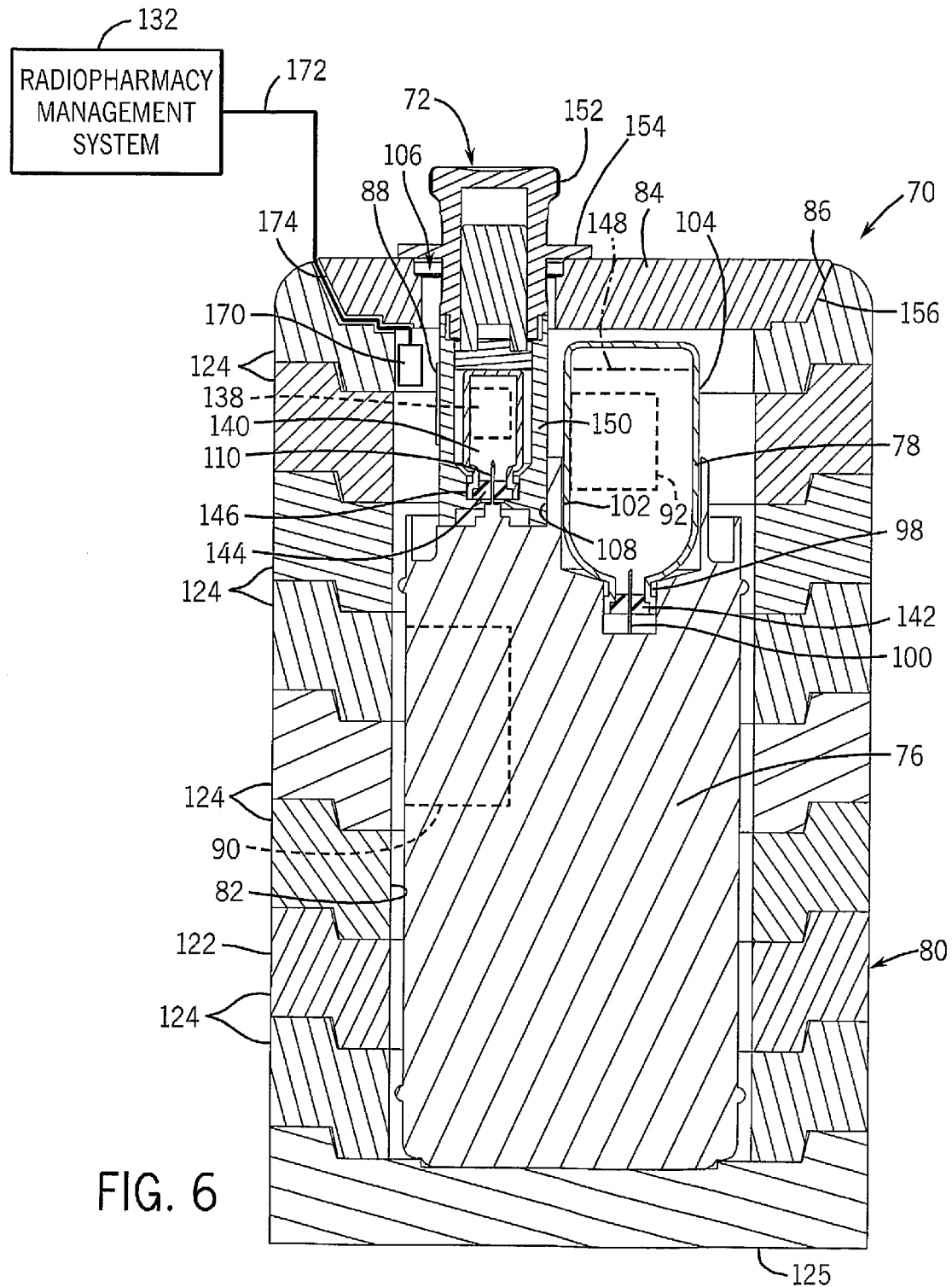
FIG. 6 is a cross-sectional side view of another embodiment of the radioisotope elution system of FIG. 3, illustrating a RFID read/write device disposed inside the auxiliary radiation shield, wherein the RFID read/write device is wired to a radiopharmacy management system disposed outside the auxiliary radiation shield.

FIG. 6 shows a variation of the radioisotope elution system 70 of FIG. 3 illustrating a RFID read/write device 170 disposed inside the auxiliary radiation shield 80 below the cover 84, wherein the RFID read/write device 170 is wired to the radiopharmacy management system 132 via wiring 172. In this exemplary embodiment, the RFID read/write device 170 may communicate signals or exchange data directly with the RFID tags 88, 90, and 92 through the airspace surrounding the radioisotope generator 76, the eluant supply container 78, and the eluate output assembly 72. In other embodiments as discussed in further detail below, the RFID read/write device. 170 may communicate signals or exchange data with the RFID tag 138 disposed on the eluate output container 140 disposed inside the hollow radiation shielded body 150 of the eluate output assembly 72. In the illustrated embodiment of FIG. 6, the wiring 172 is routed along a channel 174 extending between the cover 84 and the opening 86 of the auxiliary radiation shield 80. However, in other embodiments the channel 174 may be routed between adjacent rings 124 of the auxiliary radiation shield 80 or through other portions of the cover 84 and/or the shield 80.

Figure 7:
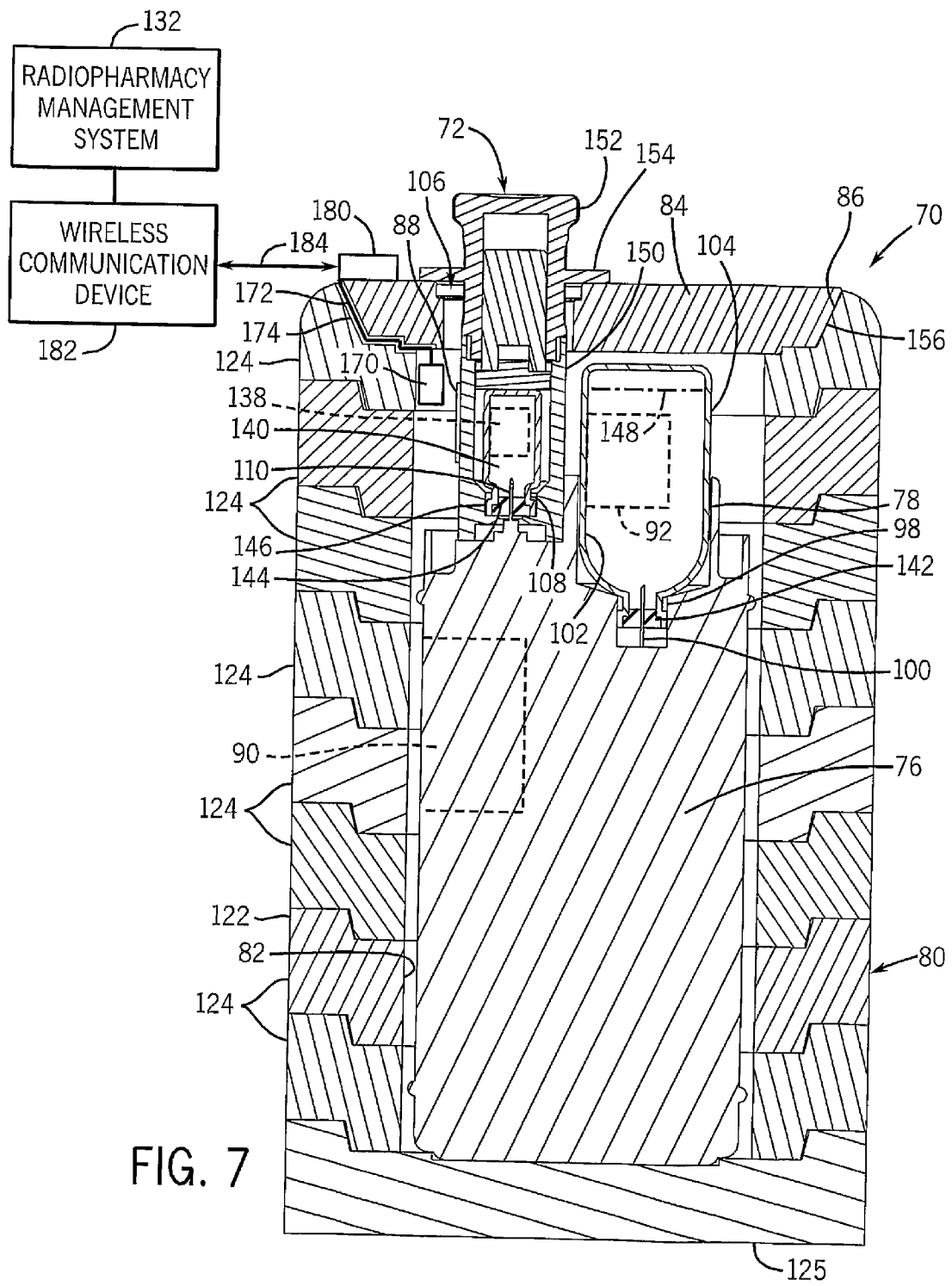
FIG. 7 is a cross-sectional side view of another embodiment of the radioisotope elution system of FIG. 3, illustrating a RFID read/write device disposed inside the auxiliary radiation shield, wherein the RFID read/write device is wired to a RFID repeater disposed outside the auxiliary radiation shield for wireless communication with a radiopharmacy management system.

FIG. 7 shows another variation of the radioisotope elution system 70 of FIG. 3 illustrating a supplemental RFID read/write device or repeater 180 disposed outside the auxiliary radiation shield 80. As illustrated, the repeater 180 may be communicatively coupled to the RFID read/write device 170 disposed inside the auxiliary radiation shield 80 via the wiring 172. Alternatively, the external repeater 180 may communicate wirelessly with the internal RFID read/write device 170 via a RFID communication transmission passage as discussed in detail above. In the illustrated embodiment, the RFID repeater 180 is disposed on top of the cover 84. For example, the RFID repeater 180 may be adhered or fastened to the cover 84 via an adhesive, screws, brackets, and/or other mounting mechanisms. In some embodiments, one or more RFID repeaters 180 may be disposed on a side or at multiple locations on the auxiliary radiation shield 80. As illustrated, the channel 174 for the wiring 172 may extend along or across the interface between the cover 84 and the opening 86 of the auxiliary radiation shield 80. Alternatively, the channel 174 may extend along or across the interface between adjacent rings 124 or through other portions of the auxiliary radiation shield 80 and/or the cover 84. The illustrated embodiment may have a wireless communication device 182 communicatively coupled to the radiopharmacy management system 132. In this wireless configuration, the illustrated embodiment may facilitate wireless signal transmissions or data exchange 184 between the radiopharmacy management system 132 and the RFID tags 88, 90, and 92 disposed inside the auxiliary radiation shield 80.

Figure 8:
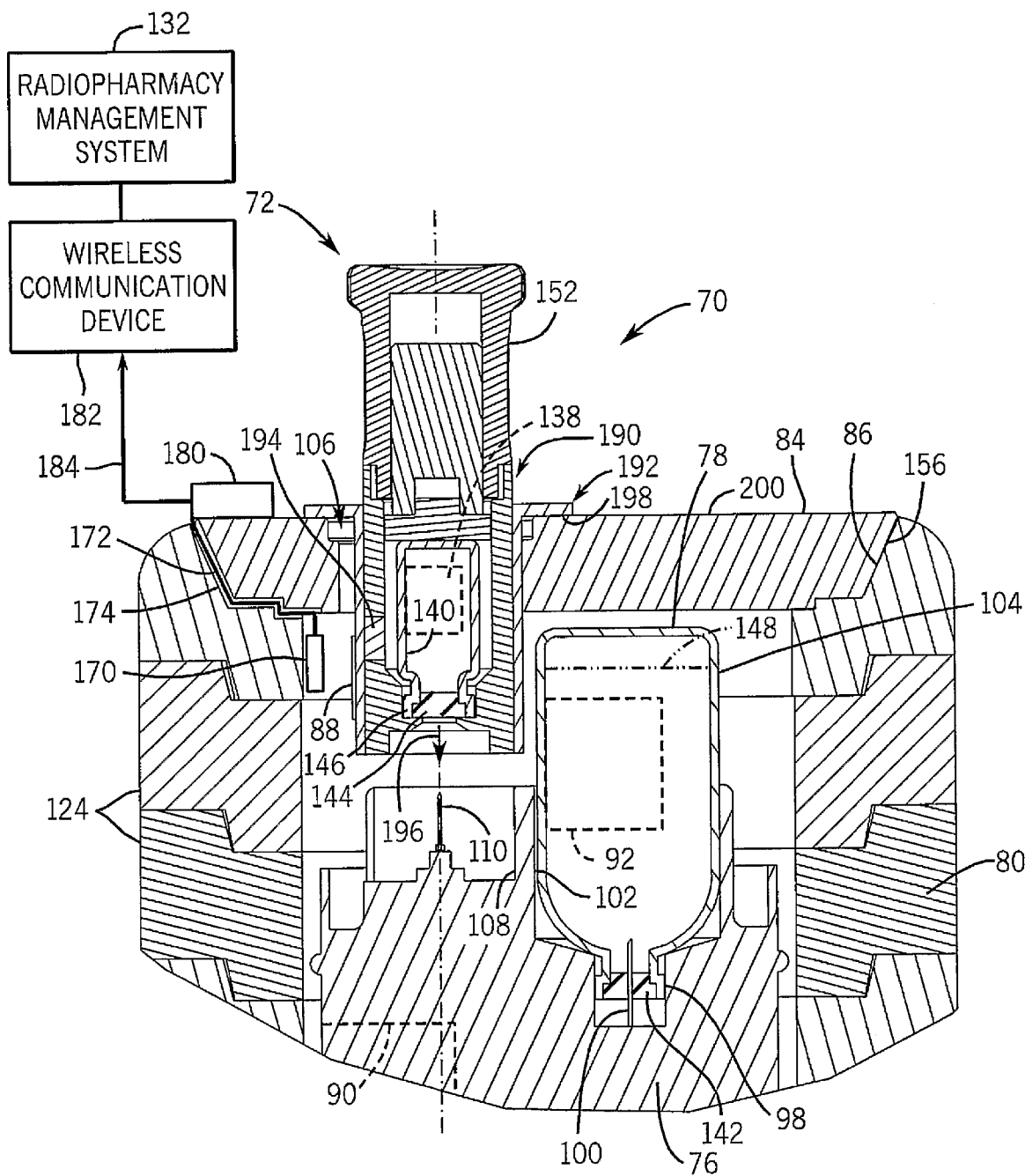
FIG. 8 is a partial cross-sectional side view of another embodiment of the radioisotope elution system of FIG. 7, illustrating the eluate output assembly partially exploded relative to the radioisotope generator, wherein a radiation shielded sleeve is disposed removably over a RFID communication transmission passage in the eluate output assembly.

FIG. 8 shows yet another variation of the radioisotope elution system 70 of FIG. 3 illustrating a mechanism 190 that may facilitate electromagnetic communication and data exchange between the RFID read/write device 170 disposed inside the auxiliary radiation shield 80 and the RFID tag 138 disposed on the eluate output container 140 disposed inside the eluate output assembly 72. Specifically, in the illustrated embodiment, the mechanism 190 may include a radiation shielded member, such as a sleeve 192, disposed moveably along or about the hollow radiation shielded body 150 of the eluate output assembly 72. In certain embodiments, the radiation shielded member or sleeve 192 may include a hinged door, a pivoting member, a sliding member, a telescoping member, or another suitable opening and closing mechanism. The illustrated mechanism 190 may include a variety of guides, fasteners, and sliding mechanisms to facilitate movement of the radiation shielded sleeve 192 upward and downward along the exterior of the hollow radiation shielded body 150.

In addition, the mechanism 190 may include one or more RFID communication transmission passages 194 through a side of the hollow radiation shielded body 150 adjacent the RFID tag 138 disposed on the eluate output container 140. For example, the RFID communication transmission passages 194 may be a vacant opening or an electromagnetic transmissive material, such as a magnetic material. The illustrated RFID communication transmission passage 194 may extend straight through the body 150. In other embodiments, the RFID communication transmission passage 194 may have a curved, angled, or generally non-linear, multidirectional geometry, such as the geometry illustrated with reference to FIGS. 1, 2, 4, and 5.

The mechanism 190 may include a spring loaded mechanism that may bias the radiation shielded sleeve 192 toward a downward covered or blocked position over the RFID communication transmission passage 194 as illustrated in FIG. 8. In the covered or blocked position of the sleeve 192, the eluate output container 140 is generally enclosed within the radiation shielding material of the eluate output assembly 72 including the radiation shielded sleeve 192. Accordingly, the eluate output assembly 72 may be separate or removed from the radioisotope elution system 70 for non-operational storage of the radioisotope generator assembly 74 and/or for processing, mixing with a tagging agent, or dispensing of the radiopharmaceutical into a suitable container or syringe.

The sleeve 192 may uncover or unblock the RFID communication transmission passage 194 during connection of the eluate output assembly 72 with the generator assembly 74. During connection or mounting of the eluate output assembly 72 as indicated by arrow 196, an upper annular lip 198 of the radiation shielded sleeve 192 may engage a top surface 200 of the cover 84 as the eluate output assembly 72 passes through the passage 106 in the cover 84. The upper annular lip 198 may hold the radiation shielded sleeve 192 in a stationary position, while the remainder of the eluate output assembly 72 can move downwardly to engage and fluidly couple with the radioisotope generator 76. In this manner, the RFID communication transmission passage 194 may become free to transmit electromagnetic energy or signals between the RFID tag 138 and the RFID read/write device 170.

Figure 9:
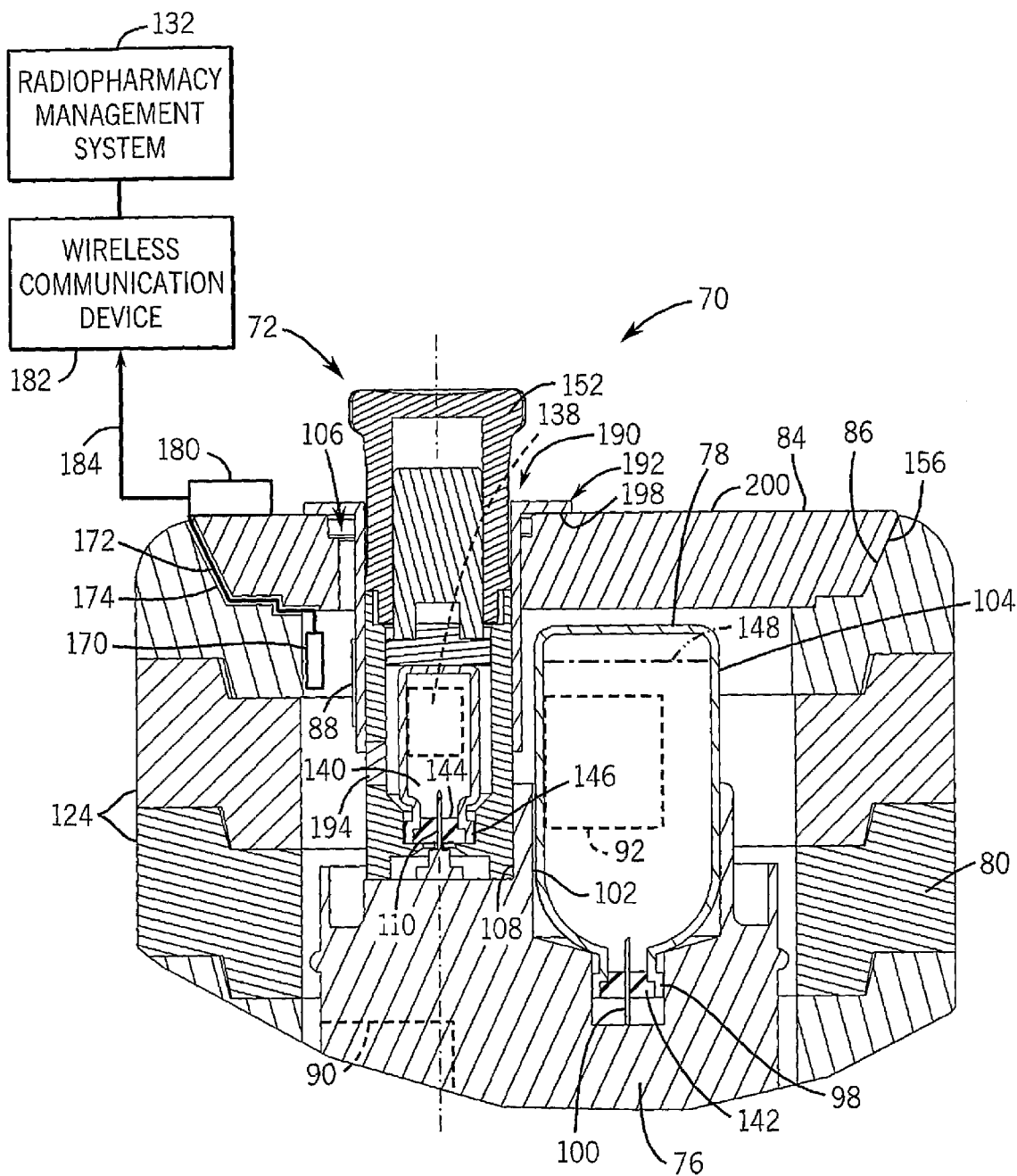
FIG. 9 is a partial cross-sectional side view of the radioisotope elution system of FIG. 8, illustrating the eluate output assembly coupled with the radioisotope generator, wherein the RFID communication transmission passage is not covered by the radiation shielded sleeve.

FIG. 9 shows the eluate output assembly 72 of FIG. 8 fully inserted downwardly into engagement with the hollow output needle 110 of the radioisotope generator 76. As illustrated in FIG. 9, the radiation shielded sleeve 192 is moved upwardly along the hollow radiation shielded body 150 of the eluate output assembly 72, such that the sleeve 192 is disposed in an uncovered or unblocked position relative to the RFID communication transmission passage 194. In this unblocked position, the RFID communication transmission passage 194 may be exposed to facilitate communication of electromagnetic signals and data between the RFID read/write device 170 and the RFID tag 138 disposed on the eluate output container 140 inside the hollow radiation shielded body 150. In the illustrated embodiment of FIG. 9, the radiopharmacy management system 132 can exchange data with each of the RFID tags 88, 90, 92, and 138 disposed on the eluate output assembly 72, the radioisotope generator 76, the eluant supply container 78, and the eluate output container 140.

FIG. 10 shows an exemplary embodiment of the eluate output assembly 72 of FIGS. 3 and 4, illustrating a RFID communication transmission passage 210 extending through the eluate output assembly 72 to a RFID read/write device 212 disposed on the upper head 154 of the eluate output assembly 72. In the illustrated embodiment, the RFID communication transmission passage 210 may begin at an internal cavity 214 having the eluate output container 140. For example, the RFID communication transmission passage 210 may be disposed in a radiation shielded portion or insert 216 within the hollow radiation shielded body 150 above the eluate output container 140. In certain embodiments, the RFID communication transmission passage 210 may have a curved, angled, zigzagging, or generally multidirectional geometry to block rays of radioactivity while permitting the transmission of RFID signals or electromagnetic data exchange between the RFID tag 138 and the RFID read/write device 212. The illustrated RFID communication transmission passage 210 may include a pair of vertical passages or paths 218 and 220 that are horizontally offset and coupled by an intermediate horizontal passage or path 222. However, the passage 210 may have a variety of other multidirectional geometries as discussed in detail above. Alternatively, the passage 210 may extend straight or vertically between the RFID tag 138 and the RFID read/write device 212.

FIG. 11 shows another embodiment of the eluate output assembly 72, illustrating a RFID read/write device 230 disposed inside the hollow radiation shielded body 150 of the eluate output assembly 72 adjacent the RFID tag 138 disposed on the eluate output container 140. In addition, the illustrated eluate output assembly 72 may include a wire 232 extending from the RFID read/write device 230 through a radiation shielded portion or insert 234 inside the hollow radiation shielded body 150 to a RFID read/write device or repeater 236 disposed on top of the upper head 152. Accordingly, signals or data can be exchanged with the RFID tag 138 while the eluate output container 140 is contained within the radiation shielding material of the eluate output assembly 172.

Figure 12:
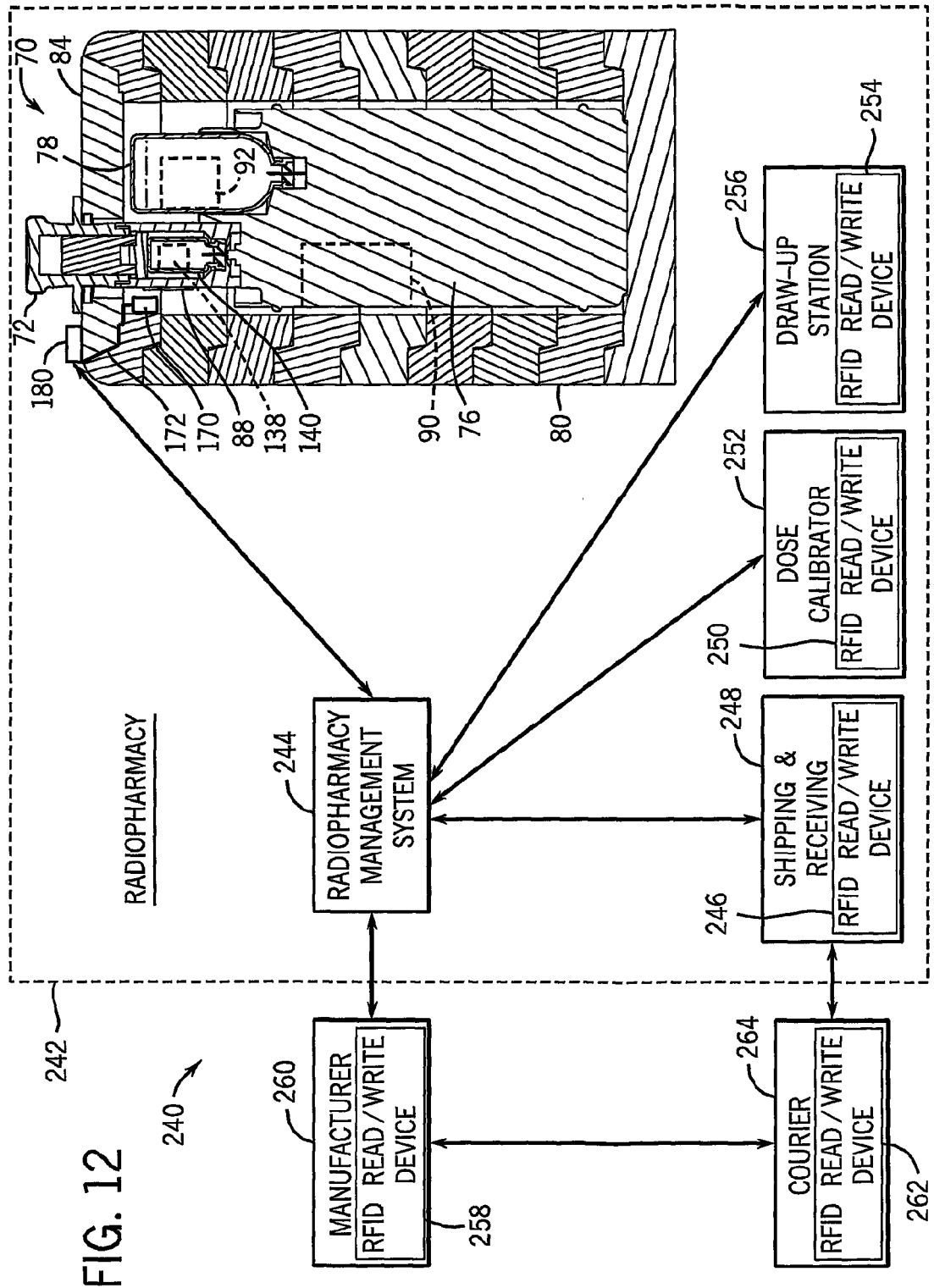
FIG. 12 is a diagrammatical view of an exemplary embodiment of a radiopharmaceutical information tracking system having RFID tags disposed on a variety of radiopharmaceutical supplies, generator components, and radiopharmaceutical products, wherein RFID read/write devices are used to communicate with these RFID tags at the manufacturer, the courier, the radiopharmacy, and other locations.

FIG. 12 shows an exemplary radiopharmaceutical information tracking system 240 that may have a plurality of RFID read/write devices and RFID tags disposed at various locations and on various containers or components associated with a radiopharmaceutical. As illustrated, the radiopharmaceutical information tracking system 240 includes a radiopharmacy 242 having a radiopharmacy management system 244 communicative with a RFID read/write device 246 associated with shipping and receiving 248, a RFID read/write device 250 associated with a dose calibrator 252, a RFID read/write device 254 associated with a draw-up station 256, and the RFID read/write device or repeater 180 disposed on the radioisotope elution system 70 as illustrated in FIG. 7. The radiopharmaceutical information tracking system 240 also may include a RFID read/write device 258 associated with a manufacturer 260 and a RFID read/write device 262 associated with a courier 264.

In certain embodiments, the radiopharmaceutical information tracking system 240 may use one or more of these RFID read/write devices 180, 256, 250, 254, 258, and 262 to obtain information, store information, or modify information pertaining to a particular radiopharmaceutical container, component, tool, or procedure. For example, the radiopharmacy management system 244 may exchange information with the RFID tags 88, 90, 92, and 138 disposed on the eluate output assembly 72, the radioisotope generator 76, the eluate supply container 78, and the eluate output container 140 via the RFID read/write devices 170 and 180 as discussed in detail above. The radiopharmacy management system 244 also may share information with the manufacturer 260, the courier 264, a medical facility, or another person or entity via a network. In certain embodiments, the radiopharmacy management system 244 may communicate radioisotope generator usage data, performance information, or other data in a batch or in real-time back to the manufacturer 260.

Figure 13:
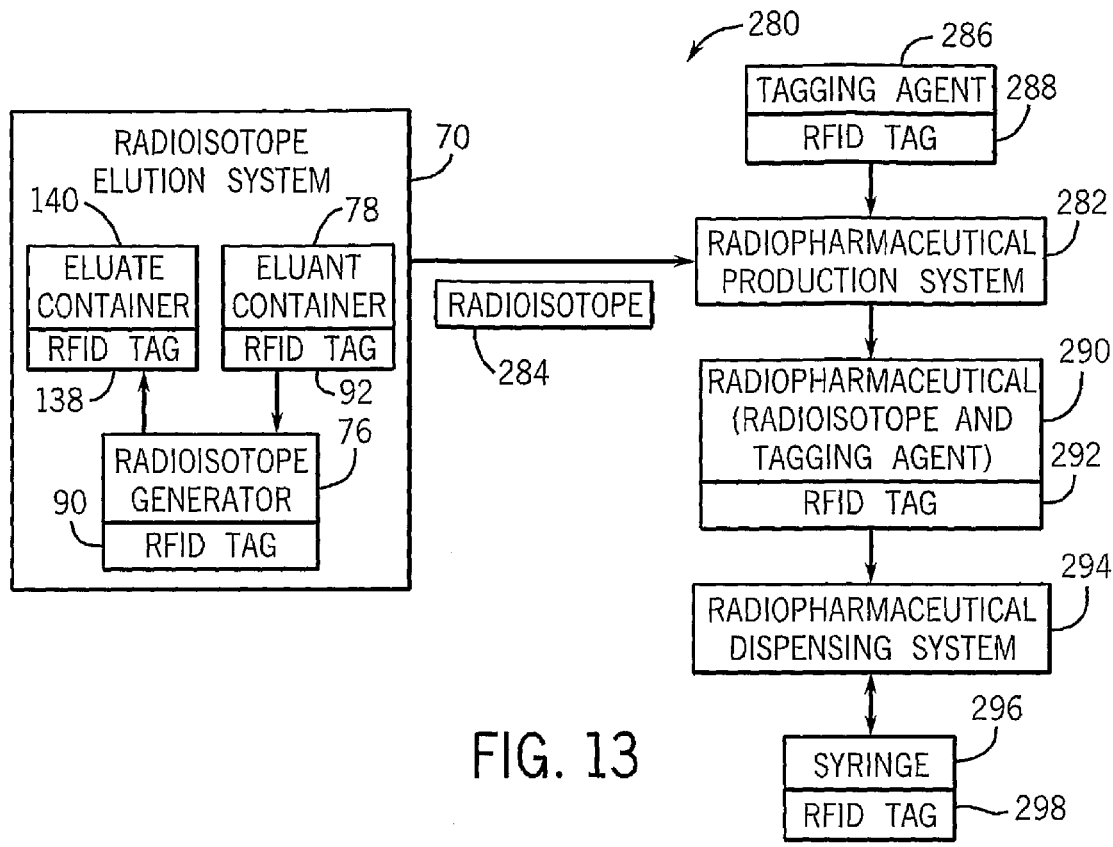
FIG. 13 is a block diagram illustrating an exemplary embodiment of a radiopharmacy or system utilizing an exemplary radioisotope elution system of the invention.

FIG. 13 illustrates an exemplary system 280 for providing a syringe having a radiopharmaceutical disposed therein for use in a nuclear medicine application. As illustrated, the system 280 includes the radioisotope elution system 70 previously described with regard to FIGS. 1-12. As illustrated, the eluant container 78 includes RFID tag 92, the radioisotope generator 76 includes RFID tag 90, and the eluate container 140 includes RFID tag 138. Again, the RFID tags 90, 92, and 138 may include information pertaining to the substance, origination date, origination location, usefulness, instructions, side effects, container capacity, prior elution data (e.g., time, duration, quantity, radioactivity level, etc.), shipping information (e.g., tracking number), and so forth. The illustrated system 280 of FIG. 13 also includes a radiopharmaceutical production system 282, which functions to combine a radioisotope 284 (e.g., technetium-99m solution acquired through use of the radioisotope elution system 70) with a tagging agent 286. In some embodiments, this radiopharmaceutical production system 282 may refer to or include what are known in the art as "kits" (e.g., Technescan® kit for preparation of a diagnostic radiopharmaceutical). In the illustrated embodiment, the tagging agent 186 also may be disposed in a container having a RFID tag 288. Again, the tagging agent may include a variety of substances that are attracted to or targeted for a particular portion (e.g., organ, tissue, tumor, cancer, etc.) of the patient. Accordingly, the RFID tag 288 may include information pertaining to the substance, origination date, origination location, usefulness, instructions, side effects, and so forth.

In operation, the radiopharmaceutical production system 282 produces or may be utilized to produce a radiopharmaceutical 290 including the radioisotope 284 and the tagging agent 286, wherein the radiopharmaceutical 290 may include a RFID tag 292. The illustrated system 280 may also include a radiopharmaceutical dispensing system 294, which facilitates extraction of the radiopharmaceutical into a vial or syringe 296 having a RFID tag 298. In certain embodiments, the various components and functions of the system 280 are disposed within a radiopharmacy, which prepares the syringe 296 of the radiopharmaceutical 290 for use in a nuclear medicine application. For example, the syringe 296 may be prepared and delivered to a medical facility for use in diagnosis or treatment of a patient. As discussed in detail above, one or more RFID read/write devices may communicate with the RFID tags 90, 92, 138, 288, 292, and 298 to access, store, modify, or generally communication information to facilitate radiopharmaceutical production, documentation, and tracking among other things.

Figure 14:
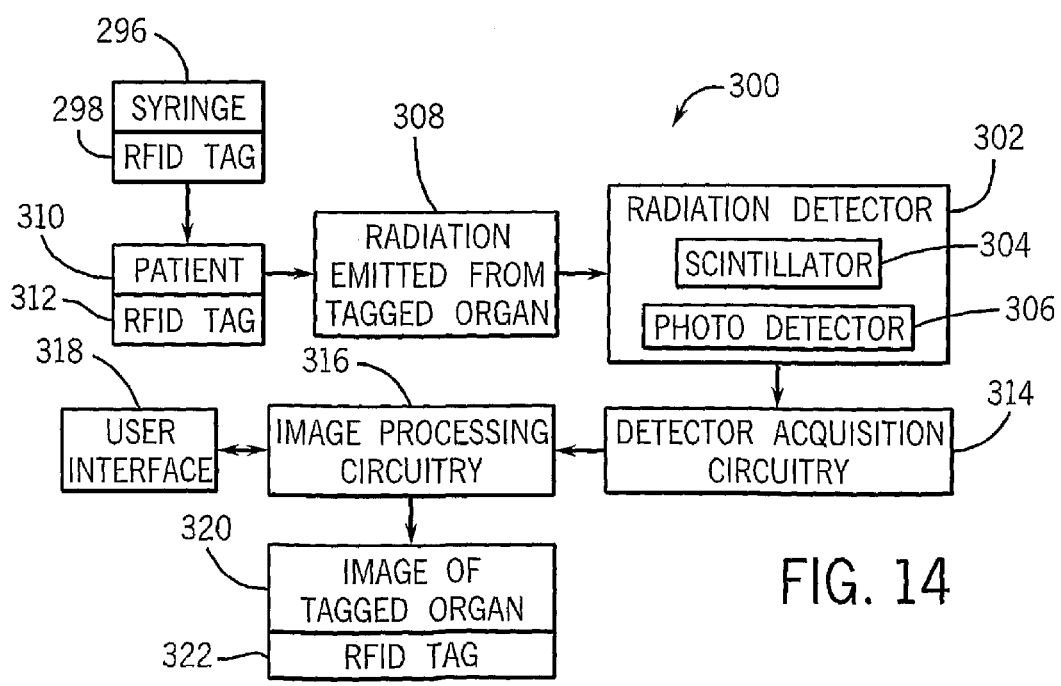
FIG. 14 is a block diagram illustrating an exemplary embodiment of a nuclear imaging system utilizing a radiopharmaceutical acquired using an exemplary radioisotope elution system of the invention.

FIG. 14 shows an exemplary nuclear medicine imaging system 300 utilizing the syringe 296 of the radiopharmaceutical 290 provided using the system 280 as illustrated in FIG. 13. Again, the syringe 296 may include the RFID tag 298 to facilitate efficient information exchange pertaining to the radiopharmaceutical 290, such that the medical imaging procedure may be performed more efficiently and accurately. As illustrated, the nuclear medicine imaging system 300 includes a radiation detector 302 having a scintillator 304 and a photo detector 306. In response to radiation 308 emitted from a tagged organ within a patient 310, the scintillator 304 emits light that is sensed and converted to electronic signals by the photo detector 306. The imaging system 300 also can include a collimator to collimate the radiation 308 directed toward the radiation detector 302. In certain embodiments, the patient 310 may be wearing, carrying, or generally moving about the medical facility with a RFID tag 312 (e.g., a wristband, neckband, or documents) to facilitate information exchange pertaining to the patient and the radiation/imaging procedure. For example, the RFID tag 312 may include information pertaining to the patient's age, family, medical insurance, emergency contact person, emergency contact number, preexisting conditions, previous medical procedures, diagnosis, referring physician, and so forth.

The illustrated imaging system 300 also includes detector acquisition circuitry 314 and image processing circuitry 316. The detector acquisition circuitry 314 generally controls the acquisition of electronic signals from the radiation detector 302. The image processing circuitry 316 may be employed to process the electronic signals, execute examination protocols, and so forth. The illustrated imaging system 300 also includes a user interface 318 to facilitate user interaction with the image processing circuitry 316 and other components of the imaging system 300. As a result, the imaging system 300 produces an image 320 of the tagged organ within the patient 310. As illustrated, the image 320 also may include a RFID tag 322. For example, the RFID tag 322 may be adhered to the front or back of the image 320 to facilitate quick storage and access of information pertaining to the image 320, patient, date, procedure conditions and protocols, and other relevant information. Again, the foregoing procedures and resulting image 320 directly benefit from the systems and devices incorporating RFID tags, read/write devices, and communication transmission passages as illustrated and described with reference to FIGS. 1-14.

When introducing elements of the present invention or various embodiments thereof, the articles "a", "an", "the", and "said" are intended to mean that there are one or more of the elements. The terms "comprising", "including", and "having" are intended to be inclusive and mean that there may be additional elements other than the listed elements. Moreover, the use of "top", "bottom", "above", "below" and variations of these terms is made for convenience, but does not require any particular orientation of the components.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A radiopharmaceutical system, comprising:
   a radioisotope elution component; and
   a radio-frequency identification (RFID) tag coupled to the radioisotope elution component.

2. The radiopharmaceutical system of claim 1, wherein the radioisotope elution component comprises a radioisotope generator.

3. The radiopharmaceutical system of claim 1, wherein the radioisotope elution component comprises an eluant supply container.

4. The radiopharmaceutical system of claim 1, wherein the radioisotope elution component comprises an eluate output container.

5. The radiopharmaceutical system of claim 1, comprising a radiation shielded enclosure disposed about the radioisotope elution component and the RFID tag.

6. The radiopharmaceutical system of claim 5, comprising a RFID communication device disposed inside the radiation shielded enclosure.

7. The radiopharmaceutical system of claim 6, comprising a RFID repeater coupled to an exterior portion of the radiation shielded enclosure, wherein the RFID repeater is communicatively coupled to the RFID communication device.

8. The radiopharmaceutical system of claim 6, comprising a radiopharmacy management system communicatively coupled to the RFID communication device.

9. The radiopharmaceutical system of claim 5, comprising a RFID communication transmission passage extending through the radiation shielded enclosure in multiple directions one after another.

10. The radiopharmaceutical system of claim 9, wherein the RFID communication transmission passage comprises a magnetic material.

11. The radiopharmaceutical system of claim 9, comprising a RFID communication device disposed outside the radiation shielded enclosure, wherein the RFID communication transmission passage enables data exchange between the RFID communication device and the RFID tag.

12. The radiopharmaceutical system of claim 5, comprising a RFID communication transmission passage extending through the radiation shielded enclosure and a radiation shielded member disposed movably between blocked and unblocked positions relative to the RFID communication transmission passage.

13. The radiopharmaceutical system of claim 12, wherein the radiation shielded member comprises a sleeve.

14. The radiopharmaceutical system of claim 1, wherein the RFID tag comprises radiopharmaceutical data including calibration data, or elution process data, or radioisotope generator data, or radiation shield data, or manufacturing data, or customer order data, or tracking data, or a combination thereof.

15. The radiopharmaceutical system of claim 1, wherein the RFID tag comprises radiopharmaceutical data including radioactivity level, or time of elution process, or duration of elution process, or identity of radioisotope generator used in elution process, or identity of eluate output container used in elution process, or size of eluate output container used in elution process, or vacuum level of eluate output container, or a combination thereof.

16. A radiopharmaceutical system, comprising:
a radioisotope generator assembly; and
a radio-frequency identification (RFID) tag disposed on a portion of the radioisotope generator assembly.

17. The radiopharmaceutical system of claim 16, wherein the radioisotope generator assembly comprises a radiation shield having a receptacle and a cover disposed over the receptacle, and a radioisotope generator disposed in the receptacle below the cover.

18. The radiopharmaceutical system of claim 16, comprising a radiation shielding material and a RFID communication transmission passage extending through the radiation shielding material.

19. The radiopharmaceutical system of claim 18, wherein the RFID communication transmission passage is angled or curved between opposite sides of the radiation shielding material.

20. The radiopharmaceutical system of claim 16, comprising a RFID communication device communicative with the RFID tag.

21. The radiopharmaceutical system of claim 20, comprising a radiopharmacy management system communicative with the RFID communication device.

22. A radiopharmaceutical system, comprising:
a radiation shielded enclosure comprising an interior, an exterior, and a radio-frequency identification (RFID) communication transmission passage extending between the interior and the exterior.

23. The radiopharmaceutical system of claim 22, wherein the radio-frequency identification (RFID) communication transmission passage is curved or angled in multiple directions one after another between the interior and the exterior.

24. The radiopharmaceutical system of claim 22, wherein the radio-frequency identification (RFID) communication transmission passage comprises a magnetic material.

25. The radiopharmaceutical system of claim 22, wherein the radio-frequency identification (RFID) communication transmission passage is disposed in a cover removably disposed over a container portion of the radiation shielded enclosure.

26. The radiopharmaceutical system of claim 22, wherein the radiation shielded enclosure comprises a cover removably disposed over a container portion, and the radio-frequency identification (RFID) communication transmission passage is disposed in the container portion.

27. The radiopharmaceutical system of claim 22, wherein radiation shielded enclosure comprises a radioisotope generator shield.

28. The radiopharmaceutical system of claim 22, wherein radiation shielded enclosure comprises an eluate output container shield.

29. A radiopharmaceutical system, comprising:
an eluate output assembly, comprising:
a radiation shielded enclosure;
an evacuated eluate output container; and
a radioisotope generator fluid coupling; and
a radio-frequency identification (RFID) tag disposed on a portion of the eluate output assembly.

30. The radiopharmaceutical system of claim 29, comprising a RFID communication transmission passage extending through the radiation shielded enclosure.

31. The radiopharmaceutical system of claim 30, wherein the RFID communication transmission passage is angled or curved between an interior and an exterior of the radiation shielded enclosure.

32. The radiopharmaceutical system of claim 30, wherein the RFID communication transmission passage comprises a magnetic material.

33. The radiopharmaceutical system of claim 30, comprising a radiation shielded sleeve disposed movably about the RFID communication transmission passage.

34. A method of using a radioisotope elution system, the method comprising:
supplying an eluant into a radioisotope generator of a radioisotope elution system;
eluting a radioisotope in the radioisotope generator;
outputting an eluate from the radioisotope generator; and
communicating data with one or more radio-frequency identification (RFID) tags disposed on one or more components of the radioisotope elution system.

35. The method of claim 34, wherein communicating data comprises channeling the data through one or more RFID communication transmission passages extending through one or more radiation shielding materials.

36. The method of claim 35, wherein channeling the data comprises blocking radioactivity rays in the one or more RFID communication transmission passages.

37. The method of claim 34, wherein communicating data comprises accessing or storing data including elution process data, or component data of one or more components of the radioisotope elution system, or tracking data, or combinations thereof.

* * * * *